(12) United States Patent
Droux et al.

(10) Patent No.: US 7,643,482 B2
(45) Date of Patent: Jan. 5, 2010

(54) SYSTEM AND METHOD FOR VIRTUAL SWITCHING IN A HOST

(75) Inventors: Nicolas G. Droux, Rio Rancho, NM (US); Sunay Tripathi, San Jose, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 467 days.

(21) Appl. No.: 11/480,261

(22) Filed: Jun. 30, 2006

(65) Prior Publication Data

US 2008/0002683 A1 Jan. 3, 2008

(51) Int. Cl.
*H04L 12/28* (2006.01)
(52) U.S. Cl. .................. 370/389; 370/401; 370/419
(58) Field of Classification Search .............. 370/252, 370/254, 255, 389, 392, 400, 401, 412, 419, 370/463

See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,356,818 B2 * | 4/2008 | Carollo et al. ............ 718/102 |
| 7,440,415 B2 * | 10/2008 | Wild et al. ................. 370/254 |
| 2002/0052972 A1 | 5/2002 | Yim | |
| 2003/0037154 A1 | 2/2003 | Poggio et al. | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Hong Cho
(74) *Attorney, Agent, or Firm*—Osha • Liang LLP

(57) ABSTRACT

A system including a plurality of virtual network interface cards (VNICs); and a Vswitch table associated with a virtual switch, wherein each entry in the Vswitch table is associated with one of the plurality of VNICs, wherein each of the plurality of VNICs is located on the host, and wherein each of the plurality of VNICs is associated with the virtual switch. The first VNIC in the plurality of VNICs is configured to receive a packet associated with a hardware address (HA), determine, using the HA, whether one of the plurality of entries in the Vswitch table is associated with the HA, send the packet to a VNIC associated with HA if one of the plurality of entries in the Vswitch table is associated with the HA, wherein the VNIC is one of the plurality of VNICs.

20 Claims, 5 Drawing Sheets

U.S. PATENT DOCUMENTS

| | | | |
|---|---|---|---|
| 2004/0267866 A1* | 12/2004 | Carollo et al. | 709/200 |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2006/0233168 A1* | 10/2006 | Lewites et al. | 370/389 |
| 2006/0294517 A1* | 12/2006 | Zimmer et al. | 718/1 |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

SYSTEM AND METHOD FOR VIRTUAL SWITCHING IN A HOST

CROSS-REFERENCE TO RELATED APPLICATIONS

The present application contains subject matter that may be related to the subject matter in the following pending U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following pending U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following pending U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "System and Method for Virtual Network Interface Cards Based on Internet Protocol Addresses" with U.S. application Ser. No. 11/479,997; "Virtual Network Interface Card Loopback Fast-path" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, embodiments of the invention relate to a system, where the system includes a first plurality of virtual network interface cards (VNICs), and a first Vswitch table associated with a first virtual switch, wherein each entry in the first Vswitch table is associated with one of the first plurality of VNICs, wherein each of the first plurality of VNICs is located on the host, and wherein each of the first plurality of VNICs is associated with the first virtual switch, wherein a first VNIC in the first plurality of VNICs is configured to: receive a first packet associated with a first hardware address (HA), determine, using the first HA, whether one of the plurality of entries in the first Vswitch table is associated with the first HA, send the first packet to a VNIC associated with first HA if one of the plurality of entries in the first Vswitch table is associated with the first HA, wherein the VNIC is one of the first plurality of VNICs, and drop the first packet if none of the plurality of entries listed in the first Vswitch table is associated with the first HA.

In general, in one aspect, the invention relates to a method of sending a packet. The method includes receiving the packet by a first virtual network interface card (NIC), wherein the VNIC is associated with a virtual switch, determining, using the HA, whether one of the plurality of entries in a Vswitch table is associated with the HA, sending the packet to a second VNIC, if one of the plurality of entries in the Vswitch table is associated with the HA and the second VNIC is associated with the HA, and dropping the packet if none of the plurality of entries listed in the Vswitch table is associated with the HA, wherein the Vswitch is associated with the virtual switch, wherein each entry in the Vswitch table is associated with one of a plurality of VNICs, wherein each of the plurality of VNICs is located on a host, and wherein each of the plurality of VNICs is associated with the virtual switch.

In general, in one aspect, the invention relates to a computer readable medium comprising computer executable instructions to perform method for sending a packet. The method includes receiving the packet by a first virtual network interface card (NIC), wherein the VNIC is associated with a virtual switch, determining, using the HA, whether one of the plurality of entries in a Vswitch table is associated with the HA, sending the packet to a second VNIC, if one of the plurality of entries in the Vswitch table is associated with the HA and the second VNIC is associated with the HA, and dropping the packet if none of the plurality of entries listed in the Vswitch table is associated with the HA, wherein the Vswitch is associated with the virtual switch, wherein each entry in the Vswitch table is associated with one of a plurality of VNICs, wherein each of the plurality of VNICs is located on a host, and wherein each of the plurality of VNIC.

Other aspects of the invention will be apparent from the following description and the appended claims.

DETAILED DESCRIPTION

Figure 1:
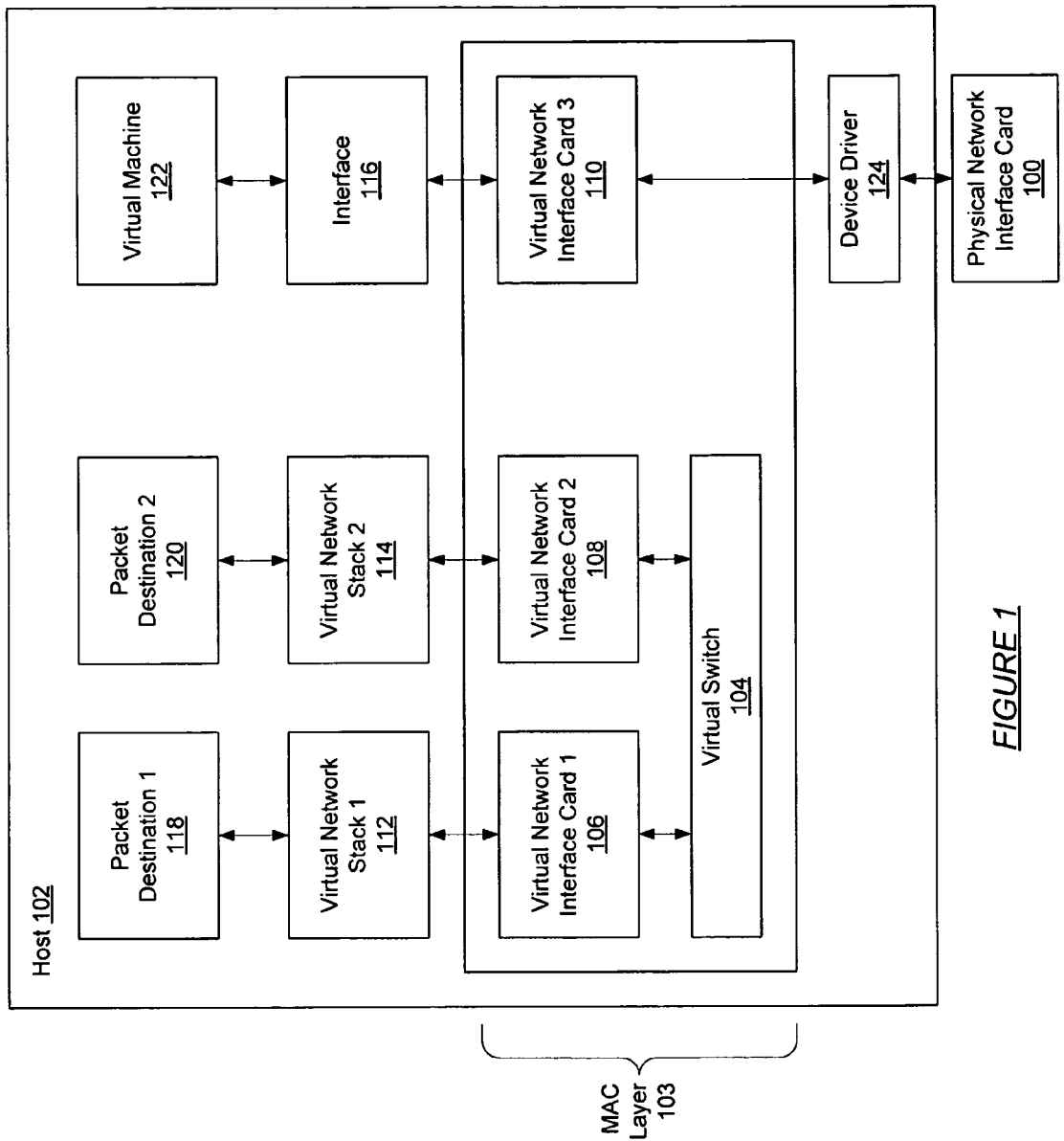
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a virtual switch. More specifically, embodiments of the invention provide a mechanism to create a virtual network within a host, where the virtual network includes two or more virtual machines (or packet destinations) operatively connected to the virtual switch. In one or more embodiments of the invention, the virtual switch restricts communication within the host such that only virtual machines (or packet destinations) operatively connected to the virtual switch may communicate with each other. Said another way, a virtual machine (or packet destination) is not able to communicate with another virtual machine (or packet destination) on the host unless the other virtual machine (or packet destination) is connected to the same virtual switch. Further, embodiments of the invention enable a virtual network within the host to be isolated from communication between the host and the external network (e.g., a Local Area Network (LAN), Wide Area Network (WAN), etc.).

FIG. 1 shows a system in accordance with one embodiment of the invention. As shown in FIG. 1, the system includes a host (100) operatively connected to a physical network interface card (NIC) (100).

In one embodiment of the invention, the physical NIC (100) is configured to receive packets from a network (not shown) (e.g., a LAN, a WAN, etc.) and send the received packets to the host (102). Further, the physical NIC (100) is also configured to receive packets from the host (102) and send the packets towards their intended destination on the network (not shown).

In one embodiment of the invention, the host (102) includes a device driver (124), a Media Access Control (MAC) layer (103), a number of virtual network stacks (VNSs) (112, 114, 116), one or more packet destinations (PD) (118, 120), and one or more number of virtual machines (VM) (122). Each of the aforementioned components is discussed below.

In one embodiment of the invention, the device driver (124) provides an interface between the host (102) and the physical NIC (100). More specifically, the device driver (124) includes functionality to obtain packets from the physical NIC (100) and send the packets to the appropriate location in the host (102). Further, the device driver (124) includes functionality to send packets from the host (102) to the physical NIC (100).

In one embodiment of the invention, the MAC layer (103) includes a virtual switch (104) and a number of virtual network interface cards (VNICs) (106, 108, 110). While FIG. 1 only shows a single virtual switch, the host (102) may include multiple virtual switches.

In one embodiment of the invention, the virtual switch (104) corresponds to a name used in host (102) to conceptually identify a virtual switch. The MAC layer (103) includes a Vswitch table that tracks which VNICs (106, 108, 110) are associated with the virtual switch and, thus, are able to communicate with each other.

More specifically, in one embodiment of the invention, each virtual switch (104) is associated with a Vswitch table, where the Vswitch table includes an entry for each VNIC (106, 108, 110) associated with the virtual switch (104). Thus, by adding an entry to a Vswitch table associated with a virtual switch (104), the VNIC identified in the entry is now able to conceptually link to the virtual switch and, accordingly, is able to communicate with the other VNICs associated with the virtual switch (104). In view of the above, the arrows showing a link between the virtual switch (104) and the VNICs (106, 108) in FIG. 1, correspond to conceptual links, where the links are realized through the entries in the associated Vswitch table.

Continuing with the discussion of the Vswitch table, each of the aforementioned entries includes a hardware address (HA) (e.g., MAC address) associated with the VNIC (106, 108, 100). In addition, each of the aforementioned entries includes a pointer to the VNIC data structure (i.e., a data structure associated with the VNIC). In one embodiment of the invention, VNIC data structure includes a function to execute to send a packet to the VNIC.

In one embodiment of the invention, each entry in the Vswitch table satisfies the following conditions: (i) the entry is associated with VNIC; (ii) the VNIC is associated with the virtual switch; and (iii) the VNIC and virtual switch reside on the same host. In one embodiment of the invention, there may be a single Vswitch for all VNSs on a given virtual switch or for VNS on the host.

In one embodiment of the invention, as additional VNICs are associated with the virtual switch (104) or as VNICs association with the virtual switch (104) are removed, the Vswitch table is updated accordingly. In one embodiment of the invention, a single Vswitch table may exist for all virtual switches on the host. In one embodiment of the invention, the Vswitch table is located in the MAC layer (103).

In one embodiment of the invention, each VNIC (106, 108, 110) is located in the MAC Layer (103) and includes the functionality of a physical NIC (100). Said another way, to all components above the VNIC (106, 108, 110) (e.g., the VNSs and the VMs), the VNICs appear as physical NICs. In one embodiment of the invention, each VNIC is assigned a unique hardware address (e.g., a MAC address) and an Internet Protocol (IP) address. The use of the term "unique" is intended to convey that the each IP and MAC address is unique with respect to the host but may not be unique with respect to all other IP or MAC addresses present on systems operatively connected to the host via the network. Continuing with the discussion of FIG. 1, each VNIC (106, 108, 110) is configured to send and receive packets from a VNS (112, 114) or is configured to send and receive from a virtual machine (122) via an interface (116). Further, VNICs (106, 108) associated with the virtual switch (104) are configured to access the Vswitch table.

In one embodiment, as shown in FIG. 1, a VNIC (106) may be associated a VNS (112, 114). VNSs are discussed below in FIG. 2. Further, each VNS (112, 114) may be associated with a packet destination (118, 120). In embodiment of the invention, the packet destination (118, 120) corresponds to any process executing in the host (102), which is configured to receive packets and does not include its own VNS.

As discussed above, a VNIC (110) may be connected to an interface (116) which, in turn, is connected to a virtual machine (122). In one or more embodiments of the invention, a VM (122) corresponds to an isolated software emulation environment, where the software emulation environment emulates a physical execution environment. Thus, to an application executing in the VM (122), the VM (122) appears as a physical execution environment. Further, each VM (122) typically includes an operating system (OS), where the OS is not necessarily the same as the OS of the host (102). The VM (122) typically includes a virtual network stack (not shown). In one embodiment of the invention, the VM (122) or an application executing in the VM (118) includes functionality to issue packets, where the packets are sent from the VM (122) to the interface (116) with which the VM is associated.

Once the packet is received by the interface (116), the packet is sent, if appropriate, towards the associated VNIC (106, 108, 110). The VNIC (106, 108, 110), upon receipt of the packet, sends the packet towards the packet destination. This processing of packets is discussed below in FIGS. 3 and 4.

Figure 2:
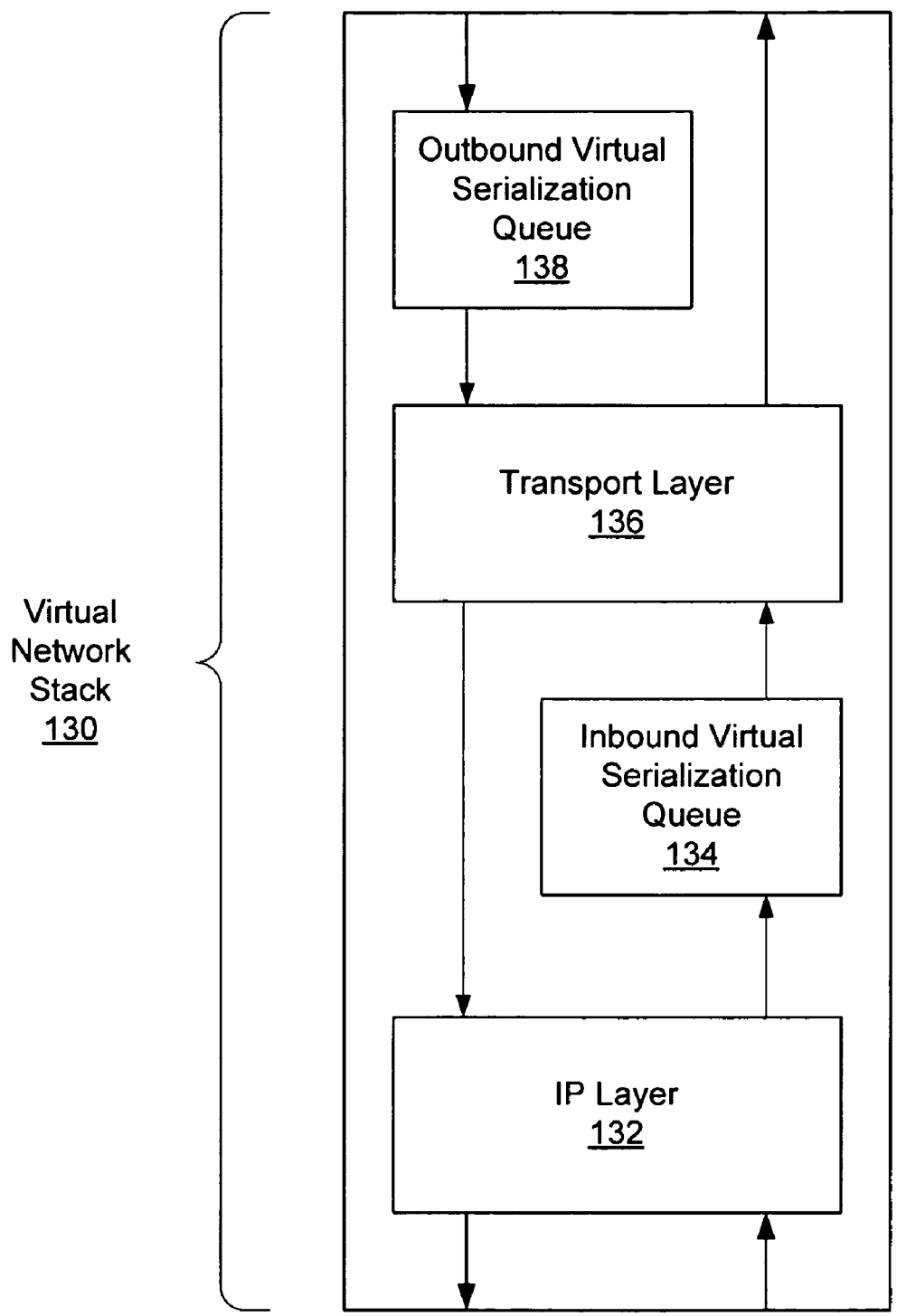
FIG. 2 shows a virtual network stack in accordance with one embodiment of the invention.

FIG. 2 shows a virtual network stack (VNS) in accordance with one embodiment of the invention. In one embodiment of the invention, the VNS (130) includes an Internet Protocol (IP) layer (132), an inbound virtual serialization queue (134), a transport layer (136), and an outbound serialization queue (138). Each of the aforementioned components is discussed below.

In one embodiment, the IP layer (132) is configured to receive packets from the VNIC associated with the VNS (134) (e.g., VNS 1 (112) receives packets from VNIC (106) in FIG. 1). Further, the IP layer (132) is configured to receive packets from the transport layer (106). In one embodiment of the invention, the IP layer (132) is configured to perform IP level processing for both inbound and outbound packets. In one embodiment of the invention, the IP layer (132) is associated with a hardware address to IP address mapping.

Continuing with the discussion of FIG. 2, the inbound VSQ (134) is configured to receive packets from the IP layer (132). The inbound VSQ (134) corresponds to a queue data structure and is configured to queue packets received from the IP layer (132) prior to the packets being processed by the transport (136). In one embodiment of the invention, the inbound VSQ (134) may be used to control the number of packets being received by the PD associated with VNS. The inbound VSQ (134) may control the bandwidth by limiting the number of packets in the VSQ (134) and preventing additional packets from entering the VNS (130) until the inbound VSQ (134) has less than a threshold number of packets.

In one embodiment of the invention, the transport layer (136) is configured to process inbound and outbound packets in accordance with Transmission Control Protocol (TCP), User Datagram Protocol (UDP), or both UDP and TCP.

In one embodiment of the invention, the outbound VSQ (138) is a queue data structure configured to receive packets from the PD with which the VNS (134) is associated. Further, the outbound VSQ (138) is configured store packets prior to sending the received packets to the transport layer (136). In one embodiment of the invention, the outbound VSQ (138) is also configured to control the flow of packets from the PD associated with the VNS (134) to the VNS (134). In one embodiment of the invention, the outbound VSQ (138) (or a related process) is configured to block an application for sending packets to the outbound VSQ (138), if the PD is attempting issue packets at a higher rate than the outbound bandwidth allocated to the PD. Further, the outbound VSQ (138) (or a related process) is configured to notify the PD when it is no longer blocked from issuing packets to the VNS (134).

In one embodiment of the invention, the inbound VSQ (134) and outbound VSQ (138) are each configured to enforce the manner in which packets are processed. Specifically, the inbound VSQ (134) and outbound VSQ (138) may be configured to enforce the packet processing requirements imposed by the transport layer (136). For example, TCP requires serial processing of packets. Thus, the inbound VSQ (134) and outbound VSQ (138) may require all threads accessing the inbound VSQ (134) and outbound VSQ (138) to conform to a mutual exclusion policy. In one embodiment of the invention, the mutual exclusion policy requires that only one thread may access the VSQ at a time. Thus, if two threads are attempting to access a given VSQ, one thread must wait until the other thread has finished accessing the VSQ.

Alternatively, if the transport layer (136) only supports UDP, then the inbound VSQ (134) and outbound VSQ (138) may be configured to allow concurrent access. Said another way, two or more threads may concurrently access the VSQ. In one embodiment of the invention, if the transport layer (136) is configured to process both TCP and UDP packets, then the inbound VSQ (134) and outbound VSQ (138) are configured to conform to the more stringent standard (e.g., TCP if the transport layer supports both TCP and UDP).

Figure 3:
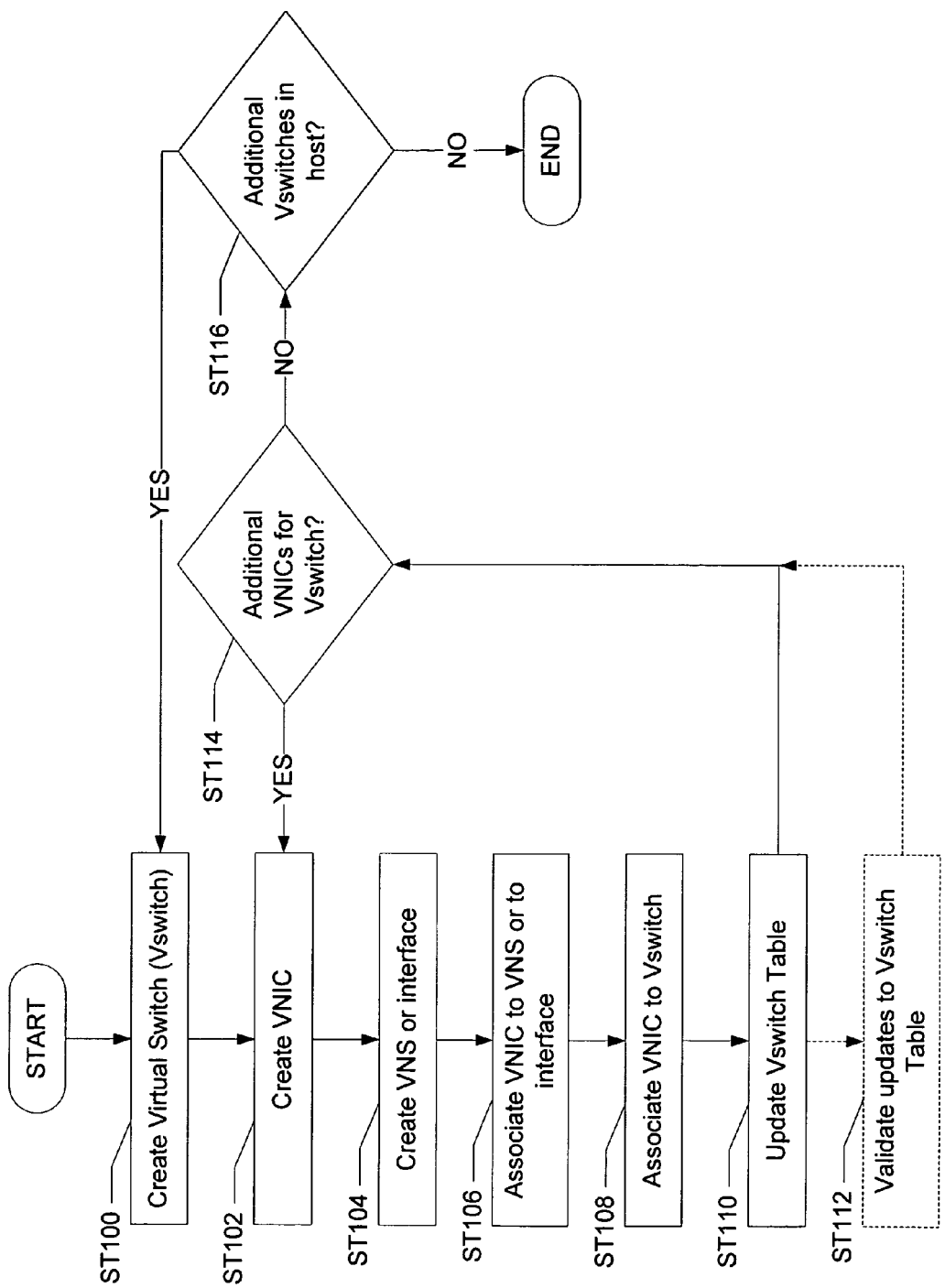
FIGS. 3 and 4 show flowcharts in accordance with one embodiment of the invention.

FIG. 3 shows a flowchart in accordance with one embodiment of the invention. More specifically, FIG. 3 shows a method for setting up a virtual switch in a host, in accordance with one embodiment of the invention. Initially, a virtual switch (Vswitch) is created (ST100). In one embodiment of the invention, the creation of the Vswitch (i.e., designating a name for the virtual switch) instantiates the creation of a Vswitch table. A VNIC (ST102) and a VNS or interface (ST104) are subsequently created. In one embodiment of the invention, creating a VNIC includes assigning a MAC address and, optionally, an IP address to the VNIC. The VNIC is then associated with the VNS or the interface (ST106) and the VNIC is associated with the Vswitch (ST108).

At this stage, the Vswitch (or a related process) updates the Vswitch table (ST110). Specifically, an entry for correspond to the VNIC (i.e., the VNIC associated with the Vswitch in ST108) is added to the Vswitch table. The entry includes a MAC address of the VNIC as well as pointer to a VNIC data structure (i.e., a data structure associated with the VNIC), where the data structure includes a function to be invoked when sending a packet to the VNIC. In one or more embodiments of the invention, each of the Vswitch entries added in ST110 is validated to ensure that they are correct (ST112).

The process then proceeds to ST114, at ST114 a determination is made whether any other VNICs need to be created and associated with the Vswitch created in ST100. If additional VNICs are to be created, the process proceeds to ST102. Alternatively, if the additional VNICs do not need to be created (at least at this time), then the process proceeds to ST116.

At ST116, a determination is made whether additional Vswitches need to be created (at this time) in the system. If additional Vswitches do not need to be created, the process ends. Alternatively, if the additional Vswitches are required, the process proceeds to ST100.

In one embodiment of the invention, a virtual switch may be created at any time while the host is executing. Further, a VNIC may be associated with a virtual switch at any time or an association of a VNIC with the virtual switch may be removed at any time.

Figure 4:
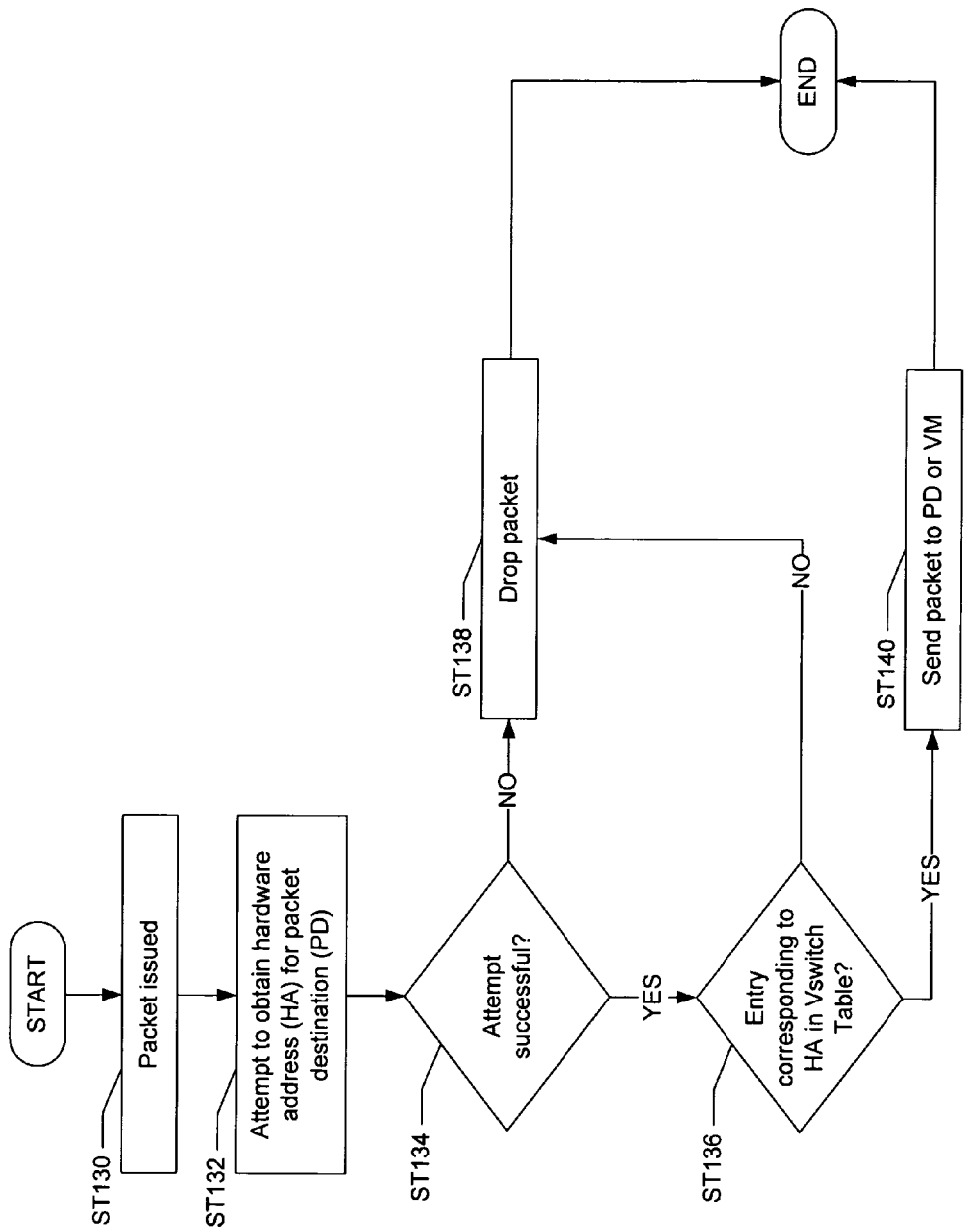

FIG. 4 shows a flowchart in accordance with one embodiment of the invention. More specifically, FIG. 4 shows a method for issuing a packet by a PD in accordance with one embodiment of the invention. Initially, a packet is issued by a PD, where the PD is associated with a VNIC and the VNIC is associated with a virtual switch (ST130). An attempt, by the VNS associated with the PD, is made to obtain the hardware address (HA) corresponding to a destination IP address of the packet (ST132). In one embodiment of the invention, ST132 includes (i) querying an Address Resolution Protocol (ARP) table to determine the HA corresponding to the destination IP address and (ii) issuing an ARP request if the query in (i) is not successful. Issuing an ARP request includes sending a broadcast packet to the associated VNIC. The VNIC, upon receiving the broadcast packet, sends the broadcast packet to all VNICs associated with the virtual switch. If the destination IP address is associated with a VNIC associated with the virtual switch, then an ARP response including the HA of the aforementioned VNIC is generated and returned to the requesting VNIC. Alternatively, if the destination IP address is not associated with a VNIC associated with the virtual switch, then the ARP request fails and the HA is not obtained.

Returning to the discussion of FIG. 4, if the HA is obtained then the attempt to obtain the HA was successful (ST134) and the process proceeds to ST 136. At ST136, the Vswitch table is queried to determine the presence of an entry that includes the HA. If such an entry is present, the packet is sent to the VNIC associated with the HA, once the packet reaches the VNIC the packet is sent to the PD or VM (ST140). As discussed above, the packet may be sent to the VNIC associated with the HA by executing a function located in a VNIC data structure referenced by a pointer in the aforementioned entry. The function, when executed, sends the packet to the VNIC associated with the HA. If an entry including the HA is not found in the Vswitch table, then the process proceeds to ST138. At ST138, the packet is dropped (i.e., not sent to the PD or VM associated with the destination IP address).

If the HA is not obtained, then the attempt to obtain the HA is not successful (ST134) and the process proceeds to ST 138. At ST138, the packet is dropped (i.e., not sent to the PD or VM associated with the destination IP address).

In one embodiment of the invention, an attempt to obtain the HA may be successful (i.e., ST133), but if subsequent to obtaining the HA and prior to querying the Vswitch table, the VNIC's association with the HA is removed, ST136 is unsuccessful.

Figure 5:
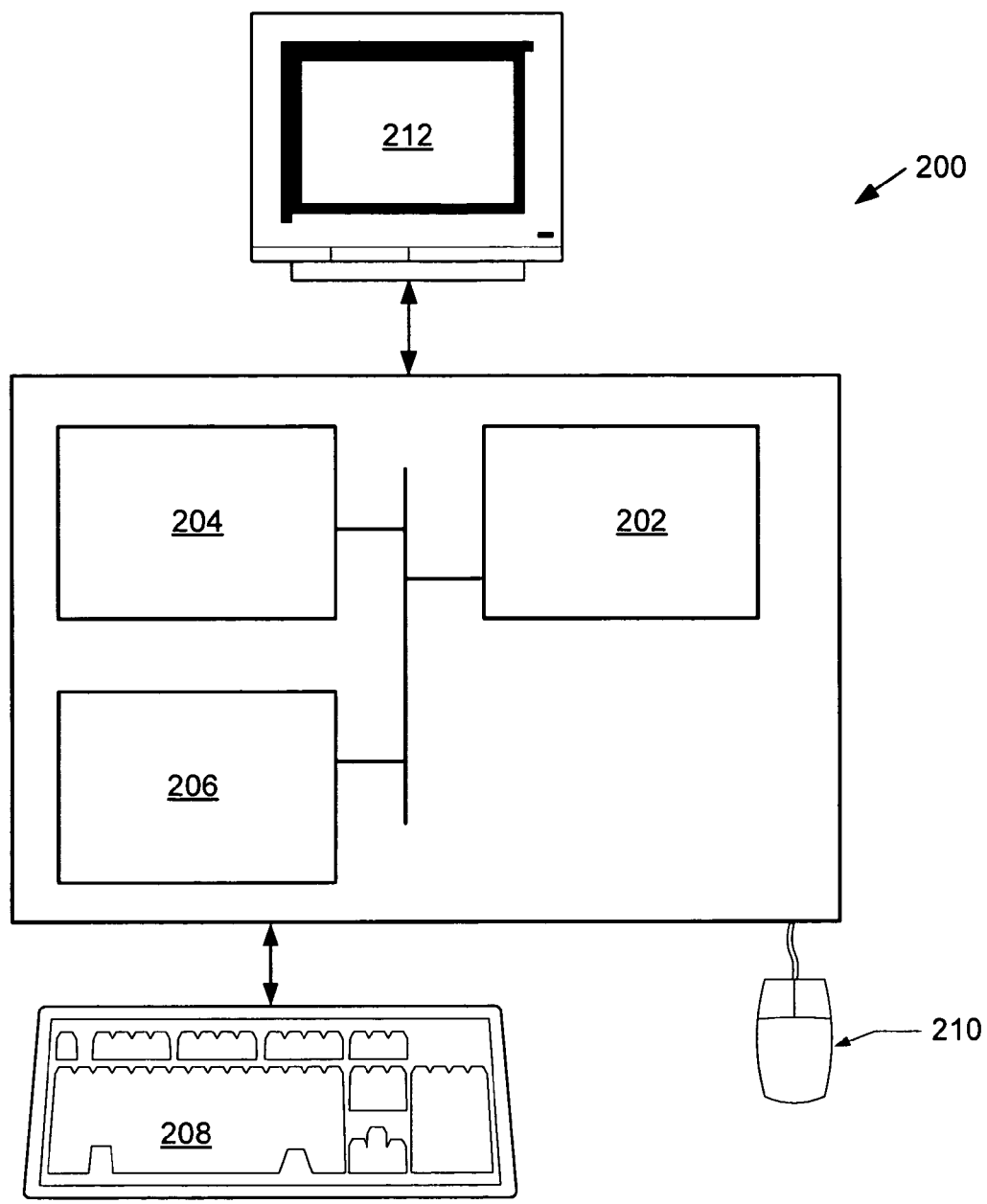
FIG. 5 shows a computer system in accordance with one embodiment of the invention.

An embodiment of the invention may be implemented on virtually any type of computer regardless of the platform being used. For example, as shown in FIG. 5, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
 a first plurality of virtual network interface cards (VNICs); and
 a first Vswitch table associated with a first virtual switch, wherein each entry in the first Vswitch table is associated with one of the first plurality of VNICs, wherein each of the first plurality of VNICs is located on a host, and wherein each of the first plurality of VNICs is associated with the first virtual switch,
 wherein a first VNIC in the first plurality of VNICs is configured to:

receive a first packet associated with a first hardware address (HA);
determine, using the first HA, whether one of the plurality of entries in the first Vswitch table is associated with the first HA;
send the first packet to a VNIC associated with first HA if one of the plurality of entries in the first Vswitch table is associated with the first HA, wherein the VNIC is one of the first plurality of VNICs; and
drop the first packet if none of the plurality of entries listed in the first Vswitch table is associated with the first HA.

2. The system of claim 1, further comprising:
a physical network interface card (NIC) operatively connected to the host, wherein the physical NIC is interposed between a network and the host; and
a second VNIC operatively connected to the physical NIC, wherein the second VNIC is not associated with the virtual switch.

3. The system of claim 1, further comprising:
a second plurality of VNICs; and
a second Vswitch table associated with a second virtual switch, wherein each entry in the second Vswitch table is associated with one of the second plurality of VNICs, wherein each of the second plurality of VNICs is located on the host, and wherein each of the second plurality of VNICs is associated with the second virtual switch;
wherein a first VNIC in the second plurality of VNICs is configured to:
receive a second packet, wherein the second packet is associated with a second hardware address (HA);
determine, using the second HA, whether one of the plurality of entries in the second Vswitch table is associated with the second HA;
send the second packet to a VNIC associated with second HA if one of the plurality of entries in the second Vswitch table is associated with the second HA, wherein the VNIC is one of the second plurality of VNICs; and
drop the second packet if none of the plurality of entries listed in the second Vswitch table is associated with the second HA,
wherein the first plurality of VNICs and the second plurality of VNICs are mutually exclusive.

4. The system of claim 1, wherein the first packet is issued by a virtual machine.

5. The system of claim 1, wherein the hardware address is a Media Access Control (MAC) address.

6. The system of claim 1, wherein the first Vswitch table and each of the first plurality of VNICs are located in a MAC layer of the host.

7. The system of claim 1, wherein the VNIC associated with first HA is associated with a virtual network stack.

8. The system of claim 1, wherein the VNIC associated with first HA is associated with an interface to a virtual machine.

9. A method of sending a packet, comprising:
receiving the packet by a first virtual network interface card (VNIC), wherein the first VNIC is associated with a virtual switch;
determining, using the HA, whether one of the plurality of entries in a Vswitch table is associated with the HA;
sending the packet to a second VNIC, if one of the plurality of entries in the Vswitch table is associated with the HA and the second VNIC is associated with the HA; and
dropping the packet if none of the plurality of entries listed in the Vswitch table is associated with the HA,
wherein the Vswitch is associated with the virtual switch,
wherein each entry in the Vswitch table is associated with one of a plurality of VNICs,
wherein the first VNIC is one of the plurality of VNICs,
wherein the second VNIC is one of the plurality of VNICs,
wherein each of the plurality of VNICs is located on a host, and
wherein each of the plurality of VNICs is associated with the virtual switch.

10. The method of claim 9, wherein the VNIC associated with first HA is associated with a virtual network stack.

11. The method of claim 9, wherein the VNIC associated with first HA is associated with an interface to a virtual machine.

12. The method of claim 9, wherein the hardware address is a Media Access Control (MAC) address.

13. The method of claim 9, wherein the packet is issued by a virtual machine.

14. The method of claim 9, wherein the Vswitch table and each of the first plurality of VNICs are located in a MAC layer of the host.

15. A computer readable medium having computer executable instructions embodied therein to perform method for sending a packet, the method comprising:
receiving the packet by a first virtual network interface card (VNIC), wherein the first VNIC is associated with a virtual switch;
determining, using the HA, whether one of the plurality of entries in a Vswitch table is associated with the HA;
sending the packet to a second VNIC, if one of the plurality of entries in the Vswitch table is associated with the HA and the second VNIC is associated with the HA; and
dropping the packet if none of the plurality of entries listed in the Vswitch table is associated with the HA,
wherein the Vswitch is associated with the virtual switch,
wherein each entry in the Vswitch table is associated with one of a plurality of VNICs,
wherein the first VNIC is one of the plurality of VNICs,
wherein the second VNIC is one of the plurality of VNICs,
wherein each of the plurality of VNICs is located on a host, and
wherein each of the plurality of VNICs is associated with the virtual switch.

16. The computer readable medium of claim 15, wherein the VNIC associated with first HA is associated with a virtual network stack.

17. The computer readable medium of claim 15, wherein the VNIC associated with first HA is associated with an interface to a virtual machine.

18. The computer readable medium of claim 15, wherein the hardware address is a Media Access Control (MAC) address.

19. The computer readable medium of claim 15, wherein the packet is issued by a virtual machine.

20. The computer readable medium of claim 15, wherein the Vswitch table and each of the first plurality of VNICs are located in a MAC layer of the host.

* * * * *